Aug. 12, 1958
A. I. REITMAN
2,847,025
FLOAT-OPERATED VALVE
Filed Nov. 29, 1954
2 Sheets-Sheet 1
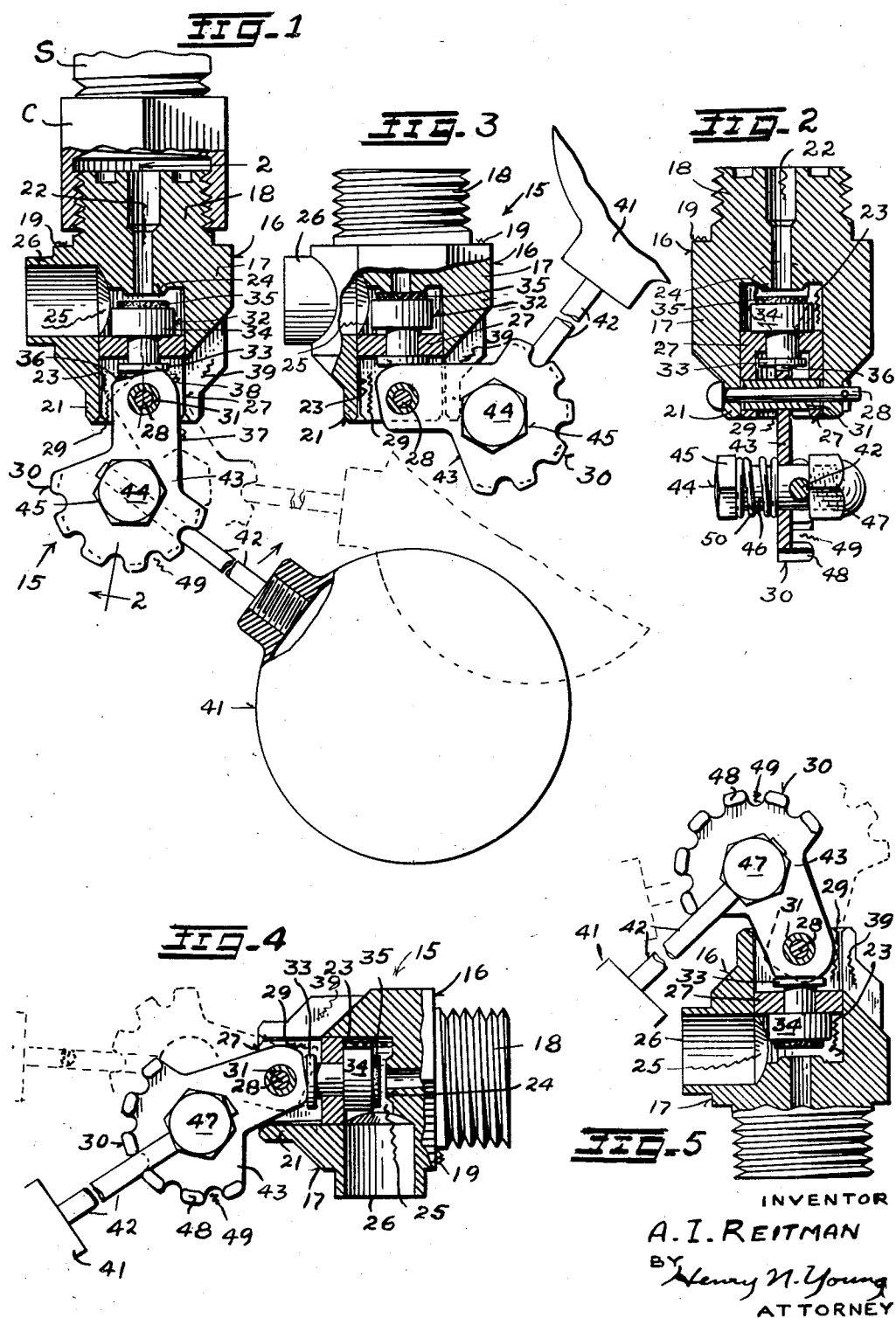
INVENTOR
A. I. REITMAN
BY
Henry N. Young
ATTORNEY

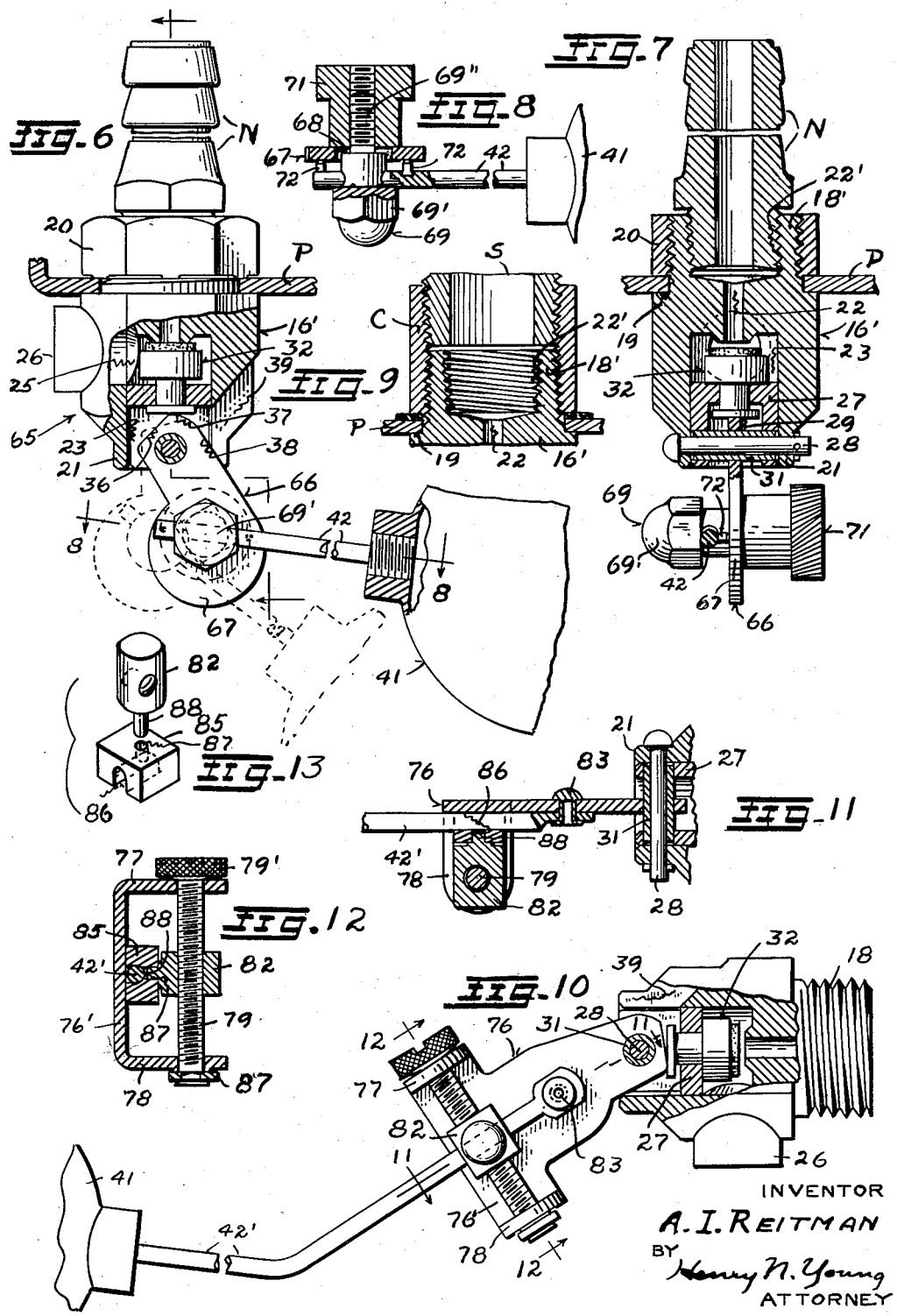

United States Patent Office 2,847,025
Patented Aug. 12, 1958

2,847,025

FLOAT-OPERATED VALVE

Abraham I. Reitman, Oakland, Calif.

Application November 29, 1954, Serial No. 471,614

4 Claims. (Cl. 137—426)

The invention relates to float-operated valves for regulating the liquid level in containers.

An object of the invention is the provision of a float controlled valve which may be operatively installed in various positions to meet various use conditions.

Another object is to provide a means of the valve for adjusting the height of the liquid level to be maintained by the valve.

A further object is to provide a valve of the character described which may be set to fully closed position independently of the position of the normally controlling float.

An added object is to provide a springless float-operated valve of particularly simple and effective structure for its purposes.

The invention possesses other objects and features of advantage, some of which, with the foregoing, will be set forth or be apparent in the following description of typical embodiments of the valve and in the accompanying drawings in which, Figure 1 is a longitudinal and medial cross-sectional view of an operative float-controlled valve illustrative of the invention and installed in depending relation to a liquid supply pipe.

Figure 2 is a longitudinal cross-sectional view taken on the line 2—2 in Figure 1.

Figure 3 is a partly sectional side elevation of the valve and showing the valve held in closed condition independently of the float.

Figure 4 is a view similar to that of Figure 3, but showing the valve in substantially horizontal position with the float operatively related to it.

Figure 5 is a sectional view of the valve operatively disposed in an inverted position with respect to its position of Figures 1 to 3.

Figure 6 is a partly sectional side elevation of another embodiment of the valve as mounted on a horizontal plate and providing a hose-connection nozzle.

Figure 7 is a longitudinal sectional view taken on the line 7—7 of Figure 6.

Figure 8 is a sectional view taken on the line 8—8 of Figure 6.

Figure 9 is a fragmentary sectional view showing the valve structure of Figures 6 to 8 as coupled to a depending supply pipe.

Figure 10 is a partly sectional side elevation of a third embodiment of the valve disposed for its connection with a horizontal supply pipe.

Figure 11 is a fragmentary view taken on the line 11—11 of Figure 10.

Figure 12 is a cross-section taken on the line 12—12 of Figure 10.

Figure 13 is an exploded perspective of two cooperative elements of the valve of Figure 10.

With particular reference to the valve structure of Figures 1 to 5 inclusive of the drawings, it will be noted that the illustrated valve 15 has a body 16 having an intermediate portion 17 of a regular polygonal outline for engagement by a suitable wrench, and an externally threaded end portion 18 extending from a flat annular seat 19 at its base and arranged for engagement by a coupling element C by which it is connected to a supply pipe S. A cylindrical duct or bore 22 of relatively small size extends coaxially in the valve body 16 from the outer end of its threaded portion 18 to a juncture within the intermediate body portion 17 with a larger coaxial bore 23 extending through and from the opposite body end portion 21. At its other end, the valve body 16 tapers to the cylindrical portion 21.

The bore 22 provides the inlet duct of the valve, and may be counterbored from its outer end, as shown, to facilitate the supply flow of liquid thereinto. An annular valve seat 24 is provided about the exit end of the inlet bore 22 at the juncture of the bore 23 therewith, and the intermediate body portion 17 is formed with a cylindrical passage 25 extending radially into it from a side point thereof with its axis substantially in the plane of the valve seat 24, said passage comprising the discharge outlet for the valve and being shown as prolonged outwardly of the valve body by a projecting annular boss 26 which is arranged to confine and more or less direct the discharge of liquid from the valve.

A cylindrical valve guide element 27 closely and removably fits the outer part of the body bore 23 and is releasably held fixed in the body with its outer end substantially flush with the extremity of the bore portion 21 by a headed retaining pin 28 engaged diametrically therethrough and through said body portion. A parallel-sided slot 29 extends diametrically into and across the element 27 from its outer end in perpendicular relation to the pin 28, and said pin swingably mounts a cam lever plate member 30 for its rocking in said slot for the positioning control of a double headed valve element 32 which is slidably mounted in an axial bore provided through the unslotted inner portion of the guide element 27. As particularly shown, the pin 28 extends through a tubular shaft 31 which is fixed in and through the lever thereat and is journaled in the guide element 27 to provide the connection between the lever and element. At the end thereof opposing the inner, and camming, end of the lever 30, the valve element 32 is provided with a head 33, and the other end of the element 32 is provided with an enlarged head 34 which provides a socket in which a valve disc 35 of compressedly yielding material is retainedly mounted in coaxial opposition to the valve seat 24 whereby movement of the disc 35 against said seat may sealedly close the connection between the inlet passage 22 and the discharge passage 25 within the valve body.

It will now be noted that the portion of the lever member 31 within the slot 29 has parallel sides, is freely movable within said slot, and has planar camming edge portions 36 and 37 connected by a curved edge portion 38, the faces of all of said camming edges being perpendicular to the plane of the lever plate portion providing them. A slot or kerf 39 is provided in the valve body radially of the portion 21, and at the opposite side thereof from the boss 26, for permitting a swinging of the cam lever 30 to the position shown for it in Figure 3, it being noted that the valve is then sealedly closed by reason of the engagement of the cam edge face 37 with the valve head 33 which is radially further from the axis of the hinge pin 28 than is the edge face 36 which is so spaced from said axis as to permit a full opening of the valve. The cam edge faces 36 and 37 are tangential to the cam edge face 38 and the latter preferably has an intermediate point thereof slightly further from the pivoting axis for the lever than is the face of the edge 37 whereby to provide a yielding "snap action" retention of the lever in the radial relation to the body 16 shown for it in Figure 3; the valve is thus held closed independently of the normally operative control float 41 which has been lifted from the liquid which normally controls its position, said float being rigidly connected to the lever 30 by a stem 42.

The portion of the valve control lever 30 which extends beyond the valve body is provided with a means for so fixing the float stem 42 thereto that the same may be angularly adjusted about an axis which is parallel to the axis of the pin 28 on which the lever is pivoted. In the present structure, the extending lever portion 43 is flat and has an arcuate edge portion having its center at the axis of a securing bolt 44 with its shank portion extending transversely through the lever portion 43. As particularly shown, the bolt 44 has a head 45, and has its round shank 46 slidably engaged in a complementary transverse opening through the lever part 43 and provided with a diametrical hole at the opposite side of the part 43 from the bolt head 45. A nut 47 is threadedly mounted on the bolt portion beyond the stem-receiving hole whereby a tightening of the nut on the bolt shank may clampedly lock a stem inserted through said shank hole in longitudinally adjusted position therein.

Along the arcuate edge thereof, the lever portion 43 is provided with an arcuate array of transverse extensions 48 of like length which are equally spaced in their line to selectively receive the bolt-held stem 42 in the notches defined between them; in order to provide for enough angular adjustments of the stem about the bolt axis, the radius of the extension circle is shown as substantially equal to the width of the part of the lever 30 from which the portion 43 extends. A compression spring 50 is constantly operative between the lever portion 43 and the bolt head 45 to urge a movement of the bolt-mounted stem toward the portion, whereby the engaged stem portion may be releasably held in fixed radially adjusted relation in accordance with receiving notch 49, it being merely necessary to sufficiently press in on the bolt head 45 to release the stem from the castellated structure provided by the extensions 48 to permit a resetting of the stem.

The described means for adjustably fixing a float stem 42 to the lever 30 is utilized for adjusting the operative relation of the float to the valve assembly either for adjustably predetermining a liquid level with respect to a fixedly mounted valve and/or making possible the installation of the valve in various positions. With reference to possible valve positioning, it will be noted that Figures 1 to 3 show the present valve 15 supported by and beneath the upright supply pipe P in depending relation to it. Figure 4 shows the valve 15 operatively conditioned and disposed for its connection with a horizontal supply pipe, while Figure 5 shows the valve 15 as operatively conditioned and disposed for its mounting at the top of a stand pipe. In order to provide the full disclosed range of adjustments for the same valve or a like valve 15, the permitted angular adjustment of the float stem with respect to the cam lever should be at least one hundred eighty degrees, and this is provided for by the present valve structure which is arranged for its operative installation at the ends of variously disposed supply pipes which are vertical or horizontal or oblique, merely by making appropriate adjustments of the float stem 42 with respect to the cam lever 30, with finer adjustments made by bending the stem as needed.

Referring now to the embodiment of Figures 6 to 9 inclusive, a float valve unit 65 is shown as having its valve body 16' providing the valve mechanism of the first embodiment; counterparts in the different embodiments are, for descriptive and comparative convenience, herein given corresponding designations. In the present embodiment, the body 16' is shown as mounted on a support plate P which might comprise a top or bottom or side wall of a closed or open container in which a controlling float 41 is operative, is arranged for optionally mounting a usual tube connection nozzle N (Figures 6 and 7) or a coupling element C (Fig. 9) for connecting the valve with a supply pipe S, and the valve mechanism has its control lever providing a different means for adjusting the float stem 42 with respect to it.

The valve body 16' is mounted on the plate P by inserting its externally threaded portion 18' through a hole in the plate P and clamping the plate against the seat 19 at the base of the portion 18' (Figs. 6 and 7) by applying a nut 20 on the portion or by utilizing a coupling C for connecting the valve body to a supply pipe S (Fig. 9) for the same purpose, it being understood that the valve body 16 of the first embodiment is also adapted for its like mounting on a support plate P by the use of the coupling C.

As is brought out in Figure 7, the inlet duct 22 of the body part 18' is counterbored at 22' to threadedly receive the base end portion of the hose-connection nozzle N having a circumferentially notched outer portion which is arranged to sealedly engage within an end of a flexible rubber hose or the like (not shown) through which liquid may be supplied to the valve under a suitable supply pressure. As is disclosed in Figure 9, the threaded counterbore 22' functions solely as a continuation of the flow passage provided by the end of a supply pipe S engaged by the coupling sleeve C. The inlet bore 22 terminates at the valve seat 24 opposite the inner end of the larger body bore 23 in which the valve guide 27 is fixed by the pin 28 and is operative to guide the movement of a valve plug 32 as in the first embodiment, the discharge of liquid from the valve being arranged to occur through the discharge passage 25 extending radially outwardly from the bore 23 through the boss 26.

It will now be noted that the pin 28 passes through a tubular shaft 31 fixed to and through the cam end of a cam lever 66 and journaled in the body portion 21, with the attached end of the lever providing the cam edges 36 and 37 and 38 for cooperation with the valve element 32 as in the embodiment of Figures 1 to 5. The inner end portion of the cam lever 66 is swingable in a plane perpendicular to the axis of the pin 28 in the slot 29 of the valve guide 27 and in the body slot 39 coplanar with the latter, whereby the lever may operatively carry the float 41 and be variably disposed under the control of the float or be placed in position for holding the valve closed in the manner shown in Figure 3.

To provide for an attachment of the float stem 42 thereto, the outer end portion 67 of the lever 66 is laterally expanded in the plane of the lever as a generally circular extension of the parallel-edged inner portion, with the edge of the latter which is movable into and from the body slot 39 generally tangent to the circle of the part 67. The portion 67 of the cam lever 66 is provided with an interior transverse opening 68 for receiving therethrough a clamp bolt 69 having the float stem 42 engaged diametrically through its head portion 69' and having its shank portion 69" extended through the opening 68 and threadedly engaged by a nut 71 whereby a tightening of the nut on the bolt may clampedly and frictionally engage the float stem 42 with the opposed side of the plate for securing the stem against rotation about the shank axis.

Preferably, and as shown, the stem portion opposite the lever part 67 is provided with sharpened prongs 72 at opposite sides of the bolt head and arranged for their dug-in engagement with the opposed face of the part 67 to positively secure the stem in adjusted angular relation to the lever when the nut 71 is fully tightened, it being understood that the angular adjustment thus provided for the float stem 42 is about an axis parallel to the axis of swinging of the lever. As particularly shown, the bolt head 69' has a larger portion of hexagonal outline for engagement by a wrench and a smaller cylindrical portion through which the valve stem is extended diametrically thereof. The nut 71 has a knurled outer portion for use in operatively tightening the bolt and a cylindrical inner portion having its inner end bearing against the lever 66 for clamping the lever between it and the prong-carrying float stem portion. The present means of controlling the angularity of the float stem 42 with respect to the lever 66 is understood to provide for more and smaller angular adjustments of the stem than are provided by the arrangement of Figures 1 to 5 inclusive.

The embodiment of Figures 10 to 13 inclusive utilizes the body and valve structure of Figures 1 to 5, but is provided with a lever 76 which so mounts a float stem 42' that a micrometer adjustment is provided for the stem with respect to the lever. As particularly shown, the lever 76 is of general T outline, and has mutually opposed and parallel ears 77 and 78 extending transversely from the ends of its head portion 76', with said ears having coaxial perforations in which the ends of a screw 79 are swiveled. In the present structure, the screw head 79' is disposed outwardly of the ear 77, is circumferentially knurled for direct manual turning, and is slotted across its end for its turning by a screwdriver applied to it. A collar 81 is fixed on the other screw end opposite the outer face of the ear 78 for cooperation with the screw head to retain the screw in its swiveled relation to the lever. A block member 82 threadedly receives the screw 79 therethrough whereby, with the block held against rotation about the screw axis, a turning of the screw will move the block along it in accordance with the direction of rotation of the screw.

In the present form of my invention, the inner end portion of the float stem 42' is flattened and is provided with an eye opening through it for receiving therethrough a tubular hinge pin 83 extending transversely through and from the lever at a point which is between the screw and the pivotal connection of the lever with the valve body 16 at the hinge pin 28 to provide for the lever control of the valve plug 32 in the previously described manner. A block member 85 is provided at one face thereof with a groove 86 which slidably receives the float stem 42'. At the face thereof opposite the groove 86, the block 85 is provided with a round hole 87 for complementarily receiving an axial projection 88 of the block 85 which threadedly receives the stem 42', a turning of the screw 79 to move the block 75 along it being permitted by reason of the floating relation of the block 85 to the stem. With this arrangement, the permitted fine angular adjustments of the float stem 42' directly provide accurate settings for the closing of the valve at a precise liquid level.

From a general consideration of the present disclosed float control valve structure, it will be understood that the embodiments of Figures 1 to 5 and Figures 6 to 9, both inclusive, are particularly adapted for their connection with the discharge ends of depending and upstanding and oblique supply pipes, the first embodiment providing spaced adjustment steps for the float stem, whereby said stem must be bent slightly for setting the valve to provide intermediate limiting levels for the controlled liquid in an open or closed container. In the embodiment of Figures 6 to 9 inclusive, the device for securing the valve stem to the valve-control cam lever generally provides a full one hundred eighty degree range of float stem adjustments without requiring any bending of the stem. The screw control of the cam lever of the embodiment of Figures 10 to 13 inclusive, on the other hand, provides for a precise "micrometer" setting of the float stem, but this arrangement does not provide for the range of float stem adjustments permitted for the first two embodiments without an appreciable bending of the stem 42' between the lever 76 and the float 41. The provision for mounting the valve body on a supporting plate P is obviously common to all of the present embodiments. Also, since no metallic springs are provided or needed in any of the disclosed valve structures per se, it will be understood that all of the present valves are springless and are therefore not subject to action variations on account of spring fatigue or corrosion.

From the foregoing description taken in connection with the accompanying drawings, the advantages of the present float-control valves will be readily understood by those skilled in the art to which the invention appertains. While I have shown and described arrangements which I now consider to be preferred embodiments of my invention, I desire to have it understood that the showings are primarily illustrative, and that such changes and developments may be made, when desired, as fall within the scope of the following claims.

I claim:

1. In a float-controlled valve of the type described, a body providing a flow passage, a shut-off valve for said passage, a valve-control lever pivoted to the body and swingable in a plane fixedly related to the body and having an extending flattened arm portion disposed parallel to the plane of swinging of the lever, a float, a stem extending from said float in fixed relation thereto, a headed bolt having its shank extending transversely through the flattened lever arm portion and having the float stem complementarily engaged in a diametric hole through an extending portion of the bolt at the opposite side of the arm portion from the bolt head, and a compression spring means constantly operative between the bolt head and the opposed side of the arm portion to normally clamp the mounted float stem against the first side of the arm to fix the stem and the arm in angularly adjusted relation for their mutual release by and upon a manual engagement of the bolt head to axially displace the bolt toward the opposed arm side.

2. In a float-controlled valve of the type described, a body providing a flow passage, a shut-off valve for said passage, a valve-control lever pivoted to the body and swingable in a plane fixedly related to the body and having an extending flattened arm portion disposed parallel to the plane of swinging of the lever, a float, a stem extending from said float in fixed relation thereto, a headed bolt having its shank extending transversely through the flattened lever arm portion and having the float stem complementarily engaged in a transverse opening through an extending portion of the bolt at the opposite side of the arm portion from the bolt head, said last side of said lever arm being provided with an arcuate line of projections having its center at the bolt axis and defining stem-receiving notches between them, and a compression spring constantly operative between the bolt head and the opposed side of the arm portion to normally secure the mounted float stem against the first side of the arm in a selected said notch for a release of the stem from the notch by and upon a manual engagement of the bolt head to axially displace the bolt toward the opposed arm side.

3. In a float-controlled valve of the type described, a body providing a flow passage, a shutoff valve for said passage, a valve-controlled lever pivoted to the body and swingable in a plane fixedly related to the body and having an extending flattened arm portion disposed parallel to the plane of swinging of the lever, a float, a stem extending from said float in fixed relation thereto, a headed bolt having its shank extending transversely through the flattened lever arm portion and having the float stem complementarily engaged in a transverse opening through a portion of the bolt extending from the opposite side of the arm portion from the bolt head, and a spring means constantly operative between the bolt head and the opposed side of the arm portion to normally clamp the mounted float stem against the first side of the arm to fix the stem and the arm in angularly adjusted relation for their mutual release by and upon an axial displacement of the bolt head toward the opposed arm side against the resistance of the spring means.

4. A structure in accordance with claim 3 whereof the bolt coaxially mounts a nut member beyond the stem-receiving opening thereof for a projection of the member against the stem in the opening to secure the stem against its longitudinal shifting with respect to the bolt.

References Cited in the file of this patent

UNITED STATES PATENTS

| | | |
|---|---|---|
| 607,286 | Sharp | July 12, 1898 |
| 741,343 | Keddington | Oct. 13, 1903 |
| 750,228 | Seager et al. | Jan. 19, 1904 |
| 858,401 | Lamb | July 2, 1907 |
| 927,368 | Mauldin | July 6, 1909 |
| 1,525,247 | Leiss | Feb. 3, 1925 |

FOREIGN PATENTS

| | | |
|---|---|---|
| 131,201 | Australia | Feb. 1, 1949 |
| 144,479 | Australia | Dec. 14, 1951 |
| 642,709 | Great Britain | Sept. 13, 1950 |